Patented May 29, 1951

2,555,042

UNITED STATES PATENT OFFICE 2,555,042

ROSIN MODIFIED MALEIC RESINS OF ENLARGED MOLECULAR SIZE

William Krumbhaar, New York, N. Y.

No Drawing. Application January 9, 1950,
Serial No. 137,667

18 Claims. (Cl. 260—26)

This invention relates to rosin based hard maleic resins of enlarged molecular size and generally improved characteristics and methods of making such resins, and particularly to such resins of melting points of 130° to 180° C., produced from rosin esterified by polyhydric alcohols and reinforced by polybasic acids of the maleic type.

The rosin modified maleic resins generally called rosin modified maleic esters are in use for a number of purposes, including surface coatings and printing inks. They are prepared usually by heating rosin in any of its various forms together with maleic type polybasic acids, and subsequently, or before, or during the heating process adding an esterifying polyhydric alcohol, all ingredients being combined in quantities and ratios so that no gelation occurs under the conditions of production.

The customary commercial resins of this type with melting points of from 130° to 160° C., as they are used in the arts for surface coatings and printing inks, particularly possess relatively small molecular size, i. e. molecular weights of only 1200 to 1400, as appears from a systematic check of the molecular weights of the majority of commercial rosin based maleic resins available today.

In such prior art practice, it is the rule in resin production that compromises must be made with regard to creating extraordinary constants in one and the same resin, i. e. that one outstanding characteristic could be obtained only at the sacrifice of some other prominent characteristic. For example if great hardness is produced, the solubility is reduced; or if high solubility is created, the chemical resistance is usually at a low point.

When the molecular size of these rosin based hard maleic resins is enlarged, the resins gain considerably in hardness, solubility, chemical resistance and heat stability. There are several methods available to achieve this result. The usual method consists in increasing the amounts of maleic acid type compounds and/or polyhydric alcohols, to be combined with the rosin element in the resin. However, both processes and products have very definite disadvantages. For mass production purposes the procedure is not practical, because gelatinization may occur at an early moment, stopping the agitator, causing exothermic reactions, and possibly overfoaming or fire. The products due to the excessive content of expensive additions, are high in cost, they possess low solubility, which is a distinct technical disadvantage, and contain large percentages of overpolymerized resin particles, which make them inhomogeneous and incompatible with many oils and pigments.

An improved method of obtaining large molecular resinous esters of outstanding characteristics is described in Patent No. 2,471,629, entitled Copal-Like Resinous Esters. In the method described in this patent, large molecular resinous esters are obtained by a process of depolymerization, i. e. resinous esters, which first are built up to molecular weights of more than 2000, are degelled until they are degraded down to molecular sizes of 1600 to 1900. Molecular sizes of this order of magnitude have to be considered as large molecules, compared to the molecular weights of about 1200 to 1400 for ordinary commercial resins serving the same purpose.

Among the objects of this invention is the production of rosin modified maleic resinous esters of enlarged molecular size, giving such esters characteristics markedly improved over the properties of such esters before molecular agglomeration, in accordance with the present invention.

Other objects of the present invention include the production of improved maleic resinous esters high in molecular weight and in those properties important for their application in coatings and inks, such as hardness, solubility, chemical resistance and heat stability.

Still further objects include the production of rosin based resins of the modified maleic class with melting points of 150 to 180°, increased in molecular weight by molecular association and improved with respect to the characteristics set forth above.

Other and further objects of the present invention will appear from the more detailed description set forth below, it being understood that this more detailed description is given by way of illustration and explanation only, and not by way of limitation, since various changes therein may be made by those skilled in the art without departing from the scope and spirit of the present invention.

In accordance with the present invention, these maleic resins produced in the orthodox prior art methods of manufacture, such rosin-modified maleic resins having melting points generally of 140 to 160° C. (but may be of from 135° C. to 165° C.) are subjected to a vacuum treatment at temperatures desirably below that at which any substantial decomposition and cracking take place, such temperatures generally not exceeding 260° C., for a period of time, in a procedure that may properly be called maturing, and the resulting resins referred to as matured resins. Conditions of temperature, vacuum and time in the maturing process can be varied in different ways and depend upon the degree of molecular association sought.

The presence of a substantial amount of maleic type substances in the resinous esters treated in accordance with the present invention is indispensable to effect molecular enlargement. In their absence, as for instance in the case of plain glycerine or pentaerythritol esters, the molecular weight is not increased by the low temperature vacuum treatment.

The temperatures employed in the processes of the present invention as a general rule lie between 5 to 25° C. lower than the temperature at which the resin was manufactured and, generally, the temperature employed will lie between 240 and 260° C. The upper limit of 260° C. should not generally be exceeded because decomposition and cracking may take place, but such effects may be permitted to take place to a limited extent if desired, although in accordance with the present invention, the upper temperature employed is desirably limited to avoid any decomposition and cracking.

The degree of vacuum applied during the manufacturing operation may vary within substantial limits, i. e. as a rule, from 10 to 26 inches and while it may be higher, it generally should not approach a full vacuum of 29 inches, because such high vacuum tends to further decomposition processes. The manufacturing process of increasing the molecular weight of the resin is based on both polymerization, which proceeds without the elimination of water, and condensation, which is accompanied by the splitting off of water. It is chiefly the phase of condensation which benefits from the application of limited vacuum.

The length of time required for the maturing of rosin based maleic type resins depends on the increase of molecular weight desired. It varies with the chemical composition of the resin, and the conditions of temperature and vacuum. As a rule, the time should not be less than 24 hours and as a matter of economy not more than 48 hours, so that in actual practice one or two full days and nights must be added to the orthodox production cycle. The speed of molecular aggregation of maleic type resins slows down after 24 hours and becomes very slow after 48 hours.

As appears from the preceding remarks, the maturing process is based on painstaking requirements and controls with regard to time, temperature and vacuum and, therefore, utilizes carefully designed machinery and equipment. The maturing process of rosin modified maleic resinous esters of melting points of 140–160° C., in particular, furthermore require definite specifications with regard to their chemical composition.

The rosin types suitable for this invention comprise gum rosin, wood rosin and polymerized rosin in their various commercial grades. The acids required for this process are maleic and fumaric acids and anhydrides and maleic acid but is preferably maleic anhydride. Fumaric acid as well as malic acid while usable, are less desirable, because their tendency for molecular association is relatively weak, and large percentages of these two acids are necessary. Maleic anhydride, however, produces distinct molecular association in resins which contain as low as 5 parts of maleic anhydride on 100 parts of rosin. The association leads to gelatinization if more than 16 parts of maleic anhydride on 100 parts of rosin are present. Accordingly, the percentage of maleic anhydride required for the purpose of this invention may vary between the limits of 5 and 16% based on the weight of the rosin. The other acids may be used in corresponding equivalent amounts.

The maleic resins here under consideration are resinous esters, in which the esterifying alcohols are either glycerine or pentaerythritol, including the various pentaerythritols such as di, tri, and other polypentaerythritols or mixtures thereof. The glycols are less desirable for the purpose of this invention, because they produce very little tendency for molecular association. Glycerine and the pentaerythritols, on the other hand, develop strong tendencies, however, with the proviso that not less of such alcohols is employed than necessary to completely esterify and neutralize the acidity present in rosin and maleic anhydride. The exact minimum amount required for maleic resins suitable for the maturing process, accordingly is determined by the stoichiometric ratios of their components. The minimum amount, as a rule, may be increased slightly close to the point at which gelatinization occurs.

To further explain the present invention, it is pointed out that in prior art processes of making commercial maleic resins, resin formation is considered to be complete and finished at the moment that the batch stays clear on cooling, that the acid number has dropped to values from 25 to 35, and the melting point has increased to the desired degree of generally between 140 and 160° C.

The molecular weight of the maleic resins at this stage, which general practice considers as complete and finished, is 1200–1400, as brought out by a systematic series of determination of a large number of commercial resins used in the trade for coating and ink purposes. The lower limit of 1200 applies to resins with melting points of 135–145° C. The upper limit of 1400 applying to resins with melting points of 155–165° C.

The maturing process of the present invention increases the molecular weights substantially, i. e. by about 450 to 550 units, with the effect that the agglomerated or matured products show molecular weights of 1650 to 1950. Molecular weights that are obtainable in the maturing process do not exceed about 2000, because at molecular sizes beyond 2000 the resins become gelatinous, and the process of this invention is applied only to such compositions which will not gelatinize on continued heating.

The molecular weights of rosin modified maleic resins are very accurately determined by the classical method of freezing point depression according to Beckmann, using about 500 grams of solvent, i. e. one hundred times larger amounts of substance than customary, employing high speed mechanical stirrers, and excluding outside influences by a large outer oil bath, the temperature of which is regulated by electrical heating within fractions of a degree. As solvent for such determinations, preferably diphenylamine is utilized, which is particularly suitable because it has an exceptionally high depression constant and good solvent power for resins at the low temperature of 50 to 60° C. As a rule, 10% of the resin is dissolved; if low molecular weights are expected, additions of less than 10% are made. Readings check within one hundredth of a degree; inasmuch as depressions in these determinations vary generally between 0.5 to 1.5 degrees, the accuracy thus achieved is about 1%.

Of great importance is the fact that the method of increasing the molecular weights of resinous esters in accordance with the present invention, at the same time improves the hardness, the solubility, the chemical resistance and the heat stability of the esters, in a way heretofore unknown.

The maturing procedure of the present invention now makes it possible to improve several resin properties at the same time without making such compromises. For instance, the hardness improves markedly, whereas the viscosity barely changes, an observation which is quite contrary to the usual prior art experience. Furthermore, in spite of increased hardness, the solubility is improved, also an observation which reverses an old established rule of resin technology, according to which solubility decreases with increasing hardness. Another unexpected feature is the balancing of the two opposite features of chemical resistance and solubility during the maturing process, in which the molecular agglomeration produces higher chemical resistance, together with higher solubility in complete parallelism.

The hardness of matured maleic resins, as measured by melting point, is improved by 10–20° C., moving the hardness up from a range of about 140–160° C. to a range of about 150–180° C., determinations being made by the A. S. T. M. method. The increase in hardness, achieved by the maturing process, at the same time has a very beneficial effect on the bodying and drying characteristics of the maleic resins.

While the melting point increases distinctly, the viscosity, as a rule, changes relatively little, its degree being measured by comparing a 60% solution in xylol with the standards of the Gardner scale.

The solubility of the maleic resins grows during the agglomeration process to such a large extent that the entire character of the resin is changed from a difficulty soluble maleic to an easily soluble maleic resin. The solubility is determined by titrating 10 grams of a solution of 60 parts of resin in 40 parts of xylol, with mineral spirits, until an incipient cloud appears, and is expressed by the number of c. c. of mineral spirits used to reach this point. The titration values move up 50–65 numbers due to the maturing process.

The chemical resistance of the resins grows with the molecular size because the resinous molecules aggregate at double bonds or other reactive points, which are easily attacked by outside influences, but which are eliminated by the process of agglomeration. This phenomenon is quite comparable to the formation of highly viscous bodied oils, the resistance of which grows during the bodying period due to the intermolecular linkages.

Chemical stability is measured and expressed in the case of maleic resins by the characteristics of acid value, iodine value and resistance to saponification.

The acid value is determined in the customary way. It declines steadily during the maturing process, which, due to the application of vacuum, removes volatile acids continuously. Thereby the chemical resistance increases simultaneously, because it is the presence of such acids which lay the resins open to chemical attacks. As a rule the acid values decrease by about 10 to 15 numbers.

The iodine value is also determined in the orthodox manner. It drops decidedly, i. e. by about 25–40 numbers during the maturing process, due to the disappearance of weak spots in the growing resin molecule.

The resistance to saponification is determined by refluxing the resin, dissolved in toluol, with an excess of potassium hydroxide, dissolved in butanol for a period of 1½ hours, and measuring by titration the amount of resin that is saponified after 1½ hours boiling. The percentage of saponified material decreases by 15–20% while the molecular size is being built up, and water and alkali resistance are improved accordingly.

It lies in the nature of the maturing process which applies vacuum for a long period of time, that it reduces the loss which the maleic resins undergo on further heating in the varnish kettle, with or without other resins or oils. Experience shows that matured resins have a much greater heat stability than non-matured resins, in other words, the heat loss, sustained by the heated resins, is greatly reduced by the molecular agglomeration. The loss is determined by weighing before and after heating, 300 grams of resin in a 600 cc. beaker for one hour at 285° C. As a rule, a non-matured maleic resin loses about 2½–3% in weight, whereas the heat loss of a high molecular resin is reduced by ½–1½%.

The following examples describe in detail the methods of carrying out the process of this invention, and also the characteristics of the products obtained by means of this invention.

*Example 1*

A rosin modified maleic resin is prepared by melting together 100 parts of polymerized rosin, 8 parts of maleic anhydride and 16 parts of glycerine, heating the batch up to 270° C. in 12 hours, and holding it at this temperature for 6 hours, applying vacuum during the last two hours.

In this way a commercial maleic resin, as used in the trade is obtained, which consequently is subjected to the maturing process. For this purpose the temperature of the batch is now lowered to 240°, and the kettle content is kept at this temperature under 22″ of vacuum for 24 hours.

The final product with enlarged molecular size has greatly improved characteristics over the orthodox maleic resin from which it has been prepared. The maturing process in this example increases the molecular weight from 1300 to 1750, hardens the melting point from 140 to 150° C., changes the viscosity from S to T, and improves the solubility titration values from 45 to 100. At the same time the acid value decreases from 35 to 20, and the iodine value declines from 115 to 85. The percentage of the saponified portion of the resin, determined as described above, decreases from 100 to 85, while the heat loss, expressed in percent, declines from 2½ to 1½.

*Example 2*

A rosin modified maleic resin is prepared by melting together 100 parts of gum rosin, 12 parts of maleic anhydride and 18 parts of glycerine, heating the batch up to 270° C. in 12 hours, and holding it at this temperature for 6 hours, applying vacuum during the last two hours.

In this way a commercial maleic resin, as used in the trade, is obtained, which consequently is subjected to the maturing process. For this purpose the temperature of the batch is now lowered to 245°, and the kettle content is kept at this temperature under 12" of vacuum for 24 hours.

The final product with enlarged molecular size has greatly improved characteristics over the orthodox maleic resin from which it has been prepared. The maturing process in this example, increases the molecular weight from 1350 to 1850, hardens the melting point from 145 to 155° C., changes the viscosity from V to X, and improves the solubility titration values from 25 to 90. At the same time the acid value decreases from 25 to 15, and iodine value declines from 110 to 80. The percentage of the saponified portion of the resin, determined as described above, decreases from 100 to 80, while the heat loss, expressed in percent declines from 3 to 1.

*Example 3*

A rosin modified maleic resin is prepared by melting together 100 parts of wood rosin, 16 parts of maleic anhydride and 20 parts of glycerine, heating the batch up to 270° C. in 12 hours, and holding it at this temperature for 6 hours, applying vacuum during the last two hours.

In this way a commercial maleic resin, as used in the trade, is obtained which consequently is subjected to the maturing process. For this purpose the temperature of the batch is now lowered to 255°, and the kettle content is kept at this temperature under 25" of vacuum for 24 hours.

The final product with enlarged molecular size has greatly improved characteristics over the orthodox maleic resin from which it has been prepared. The maturing process, in this example, increases the molecular weight from 1400 to 1950, hardens the melting point from 150 to 160, changes the viscosity from Y to Z, and improves the solubility titration values from 12 to 75. At the same time the acid value decreases from 30 to 15, and iodine value declines from 105 to 80. The percentage of the saponified portion of the resin, determined as described above, decreases from 100 to 80, while the heat loss, expressed in percent, declines from 3 to 1.

*Example 4*

A rosin modified maleic resin is prepared by melting together 100 parts of polymerized rosin, 9 parts of maleic anhydride and 15 parts of pentaerythritol, heating the batch up to 270° C. in 12 hours, and holding it at this temperature for 6 hours, applying vacuum during the last two hours.

In this way a commercial maleic resin, as used in the trade, is obtained, which consequently is subjected to the maturing process. For this purpose the temperature of the batch is now lowered to 255°, and the kettle content is kept at this temperature under 20" of vacuum for 36 hours.

The final product with enlarged molecular size has greatly improved characteristics over the orthodox maleic resin, from which it has been prepared. The maturing process, in this example, increases the molecular weight from 1250 to 1700, hardens the melting point from 160 to 175° C., changes the viscosity from Y to Z, and improves the solubility titrations values from 35 to 95. At the same time the acid value decreases from 35 to 20, and iodine value declines from 120 to 90. The percentage of the saponified portion of the resin, determined as described above, decreases from 90 to 70, while the heat loss, expressed in percent, declines from 2½ to 1.

*Example 5*

A rosin modified maleic resin is prepared by melting together 100 parts of polymerized rosin, 5 parts of maleic anhydride, and 15 parts of polypentaerythritol, heating the batch up to 270° C. in 12 hours, and holding it at this temperature for 6 hours, applying vacuum during the last two hours.

In this way a commercial maleic resin, as used in the trade, is obtained, which consequently is subjected to the maturing process. For this purpose the temperature of the batch is now lowered to 260°, and the kettle content is kept at this temperature under 10" of vacuum for 48 hours.

The final product with enlarged molecular size has greatly improved characteristics over the orthodox maleic resin from which it has been prepared. The maturing process, in this example, increases the molecular weight from 1300 to 1750, hardens the melting point from 160 to 180, changes the viscosity from $Z_1$ to $Z_2$, and improves the solubility titration values from 45 to 95. At the same time the acid value decreases from 30 to 20 and iodine value declines from 125 to 85. The percentage of the saponified portion of the resin, determined as described above, decreases from 90 to 70, while the heat loss, expressed in percent, declines from 2½ to ½.

*Example 6*

A rosin modified maleic resin is prepared by melting together 100 parts of gum rosin, 9 parts of maleic anhydride and 12 parts of pentaerythritol and 5 parts of glycerine, heating the batch up to 270° C. in 12 hours, and holding it at this temperature for 6 hours, applying vacuum during the last two hours.

In this way a commercial maleic resin, as used in the trade, is obtained, which consequently is subjected to the maturing process. For this purpose the temperature of the batch is now lowered to 260°, and the kettle content is kept at this temperature under 25" of vacuum for 24 hours.

The final product with enlarged molecular size has greatly improved characteristics over the orthodox maleic resin, from which it has been prepared. The maturing process, in this example, increases the molecular weight from 1200 to 1650, hardens the melting point from 150 to 160, changes the viscosity from W to X, and improves the solubility titration values from 40 to 100. At the same time the acid value decreases from 25 to 15, and iodine value declines from 120 to 90. The percentage of the saponified portion of the resin, determined as described above, decreases from 95 to 75, while the heat loss, expressed in per cent, declines from 2½ to ½.

Having thus set forth my invention, I claim:

1. The method of maturing resinous esters which comprises heating to a temperature of about 240 to 260° C. for from 24 to 48 hours under vacuum of from 10" to 29" of mercury, a non-gelatinizing rosin-polybasic acid-polyhydric alcohol resin in which the polybasic acid is selected from the group consisting of maleic and fumaric acids and their anhydrides and malic acid, and the polyhydric alcohol is selected from the group consisting of glycerol, pentaerythritol, polypentaerythritols and mixtures thereof, to give a matured product of higher melting point and higher molecular weight and increased hardness, solubility, chemical resistance and heat stability.

2. The method of claim 1 in which the acid is maleic anhydride, the ratio of rosin to anhydride is from 5:100 to 16:100 parts by weight, and the amount of alcohol is sufficient to esterify the rosin and maleic anhydride, the vacuum is from 10″ to 26″; the non-gelatinizing resin subjected to treatment has a melting point of from 135 to 165° C. and a molecular weight of from 1200 to 1400, while the matured resin has a melting point of from 150 to 180° C., a molecular weight of from 1650 to 1950 and simultaneously increased hardness, solubility, chemical resistance and heat stability.

3. The method of claim 2 in which the alcohol is glycerol.

4. The method of claim 2 in which the alcohol is pentaerythritol.

5. The method of claim 2 in which the alcohol is polypentaerythritol.

6. The method of claim 2 in which the alcohol includes both glycerol and a pentaerythritol.

7. The method of claim 2 in which the rosin is polymerized resin.

8. The method of claim 2 in which the rosin is gum rosin.

9. The method of claim 2 in which the rosin is wood rosin.

10. A matured, non-gelatinized rosin-polybasic acid-polyhydric alcohol resin in which the polybasic acid is selected from the group consisting of maleic and fumaric acids and anhydrides and malic acid, the alcohol is selected from the group consisting of glycerol, pentaerythritol, polypentaerythritols and mixtures thereof, the ratio of acid to rosin being from 5:100 to 16:100 parts by weight, and the ratio of alcohol to acid and rosin being sufficient to esterify the acid and rosin, the matured resin having a melting point of from 150 to 180° C., a molecular weight of from 1650 to 1950 and improved hardness, solubility, chemical resistance, and heat stability.

11. The matured resin of claim 10 in which the acid is maleic anhydride.

12. The matured resin of claim 11 in which the alcohol is glycerol.

13. The matured resin of claim 11 in which the alcohol is pentaerythritol.

14. The matured resin of claim 11 in which the alcohol is polypentaerythritol.

15. The matured resin of claim 11 in which the alcohol includes both glycerol and a pentaerythritol.

16. The matured resin of claim 11 in which the rosin is polymerized rosin.

17. The matured resin of claim 11 in which the rosin is gum rosin.

18. The matured resin of claim 11 in which the rosin is wood rosin.

WILLIAM KRUMBHAAR.

No references cited.